United States Patent [19]

Kensrue

[11] Patent Number: 4,954,690

[45] Date of Patent: Sep. 4, 1990

[54] MODULAR WELDING GUN

[76] Inventor: Milo M. Kensrue, 49-320 Sunrose La., Palm Desert, Calif. 92260

[21] Appl. No.: 332,873

[22] Filed: Apr. 3, 1989

[51] Int. Cl.$^5$ ............................................. B23K 9/12
[52] U.S. Cl. .............................. 219/137.31; 219/137.7
[58] Field of Search ...................... 219/137.31, 137.32, 219/74, 136, 137.7

[56] References Cited

U.S. PATENT DOCUMENTS 3,143,633  8/1964  Wadleigh ........................ 219/137.2
4,782,204  11/1988  Gartland .......................... 219/7 H

Primary Examiner—Clifford C. Shaw

Attorney, Agent, or Firm—Plante, Strauss, Vanderburgh & Connors

[57] ABSTRACT

Disclosed is a welding gun which includes a mounting block, a motor mounted to the welding block and a barrel through which welding wire is fed by drive rollers turned by the motor. There is a passageway through the welding block which has a valve therein for controlling the flow of a shielding gas through the passageway and through the barrel. A speed control mechanism device is mounted within a removable casing that encloses the block, motor, and speed control mechanism. The speed control includes a knob which is turned by the welder and includes a tactile response element that better enables the welder to determine the correct setting for the desired speed of the wire even though wearing a glove.

3 Claims, 7 Drawing Sheets

MODULAR WELDING GUN

BACKGROUND OF THE INVENTION

1. Field of the Invention:

This invention relates to welding guns, and in particular to a welding gun which is modular in design so that it is easy to trouble shoot and repair in the field and economical to manufacture.

2. Background Discussion:

Welding guns generally are of two types: water cooled and air cooled. The air cooled type is generally lighter weight and smaller than the water cooled guns. In either case, however, it is highly desirable for the gun to be as lightweight and compact as possible so that it will be easy for the welder to manipulate it in work areas that do not have a great deal of room to maneuver.

In general these guns include a mounting block to which a barrel is attached to the front end, and attached to the rear end is a wire feed conduit, a shielding gas hose, and an electrical power cable. The handle for the gun is mounted to this block generally near its central section and has a trigger adjacent to it that, when actuated, provides a signal for the gas and wire to be fed out the barrel of the gun.

SUMMARY OF THE INVENTION

It is the objective of the present invention to provide a welding gun which is substantially smaller than conventional guns, and more importantly, is easy to trouble shoot in the field, repair, and assemble during manufacture.

There are several features of this invention, no single one of which is solely responsible for its desirable attributes. Without limiting the scope of this invention as expressed by the claims, its more prominent features will now be discussed briefly. After considering this discussion, and particulary after reading the section of this application entitled "DETAILED DESCRIPTION OF THE PREFERRED EMBODIMENT," one will understand how the features of this invention provide its advantages.

The first feature of the welding gun of this invention is that it is highly modular. It includes a metal block, preferably of aluminum which is lightweight and conductive, a barrel which is removably mounted to the block, and a variable speed control torque motor which is removably mounted to the block and also serves as the handle of the gun. The block and motor are enclosed within an insulating casing which is divided into two sections which are removably joined together, enabling the casing to be easily disassembled to detach the motor from the block.

The second feature of this invention is a speed control mechanism for the motor which is attached to the free end of the motor, that is, the end which is not attached to the block. This position of the speed control mechanism is a very convenient location and provides ease of access during use.

The third feature of this invention is that the speed control mechanism is designed to enable the welder, whose hands are ordinarily protected by work gloves, to readily control the wire feed by manually manipulating the speed control mechanism. This speed control is also enclosed within the casing but has an exposed knob located at the very end of the handle for easy access by the welder.

The fourth feature is that the speed control mechanism includes a potentiometer having a rotatable slider which allows for at least 1000 degrees of rotation between the lowest and highest setting of the potentiometer. Because of this feature, the speed control mechanism is desensitized so that a few degrees of turn is required to produce a significant change in wire speed. Thus, the welder, with his hands covered by work gloves, can turn the control knob, and with relative ease position the knob the setting that produces the desired wire speed. In contrast, if only 270 degrees of rotation existed between the highest and lowest setting, the speed control mechanism would be too sensitive and it would take more time and patience on the part of the welder to adjust the wire feed.

The fifth feature of this invention is that the welding block has a passageway extending from its rear face to its front face with a control valve in the passageway including a valve actuator that extends outwardly from the block and engages a trigger element. There is also a micro switch which also engages the trigger element upon the trigger being pulled. The trigger is mounted in a conventional location, but includes the trigger element which first engages the valve actuator to allow gas to flow through the passageway to the tip of the barrel and then next engages the micro switch to turn on the motor to drive the means which feeds the wire to the tip of the barrel.

In accordance with the modular aspect of the welding gun of this invention, the speed control, micro switch, and trigger are all removably mounted. Because these elements, as well as the casing, motor and barrel are all removably attached, if any one of these is defective, it is easy to trouble shoot by substituting new components. If a substituted component results in the gun functioning properly, then the original component is simply discarded or brought back to the shop for repair. For example, the casing can be removed and the micro switch replaced if the gun is not operating. Upon replacement of the micro switch, if the gun operates correctly then the problem has been isolated. If on the other hand replacement of the micro switch does not result in the gun functioning properly, the motor is replaced. This may be the problem and the new motor will result in the gun functioning properly. Because it is easy to disassemble the gun into its various components, this can be done by a repairman without extensive training who can both trouble shoot and repair in the field. The modularity also lends itself to ease of assembly during manufacture.

The preferred embodiment of this invention illustrating all its features will now be discussed in detail in connection with the accompanying drawing.

BRIEF DESCRIPTION OF THE DRAWING

The welding gun of this invention is illustrated in the drawing, which is for illustrative purposes only and wherein like numerals indicate like parts, and in which.

DESCRIPTION OF THE PREFERRED EMBODIMENT

As best shown in FIGS. 1 through 4. the welding gun 10 of this invention includes and elongated aluminum block 12, a barrel 14 removably attached to the block, a motor 16 removably attached to the block, a speed control mechanism 18 for the motor, and a molded plastic casing 20 which encloses the block and motor when these components are assembled.

Figure 17:
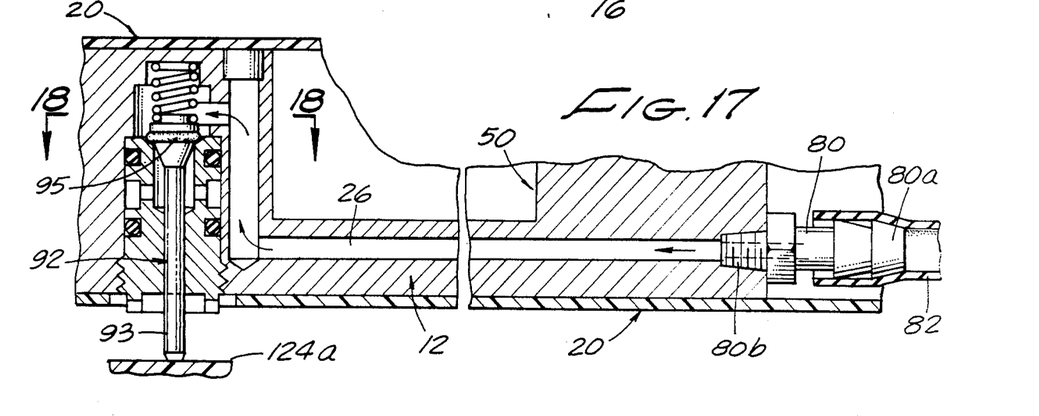
FIG. 17 is a fragmentary view, in cross-section, taken along line 17—17 of FIG. 8.
Figure 18:
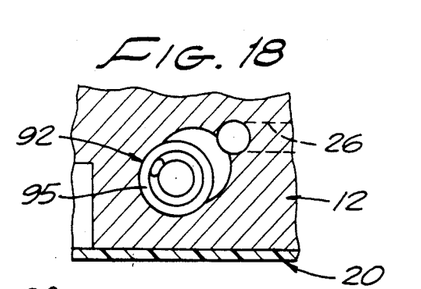

The block 12 is relatively small compared to conventional welding guns. Its length does not exceed five inches, its width does not exceed one and three-quarters inches, and its height does not exceed 1.5 inch. The front face 22 has a central opening 24 therein which is in communication with one end of a passageway 26 (FIG. 17) that extends generally along the length of the block 12. There is a slit 28 in this front face 22 which has a screw 30 passing through it extending from the top of the block 12 through the slit 28 into the body of the block.

Figures 8, 20:
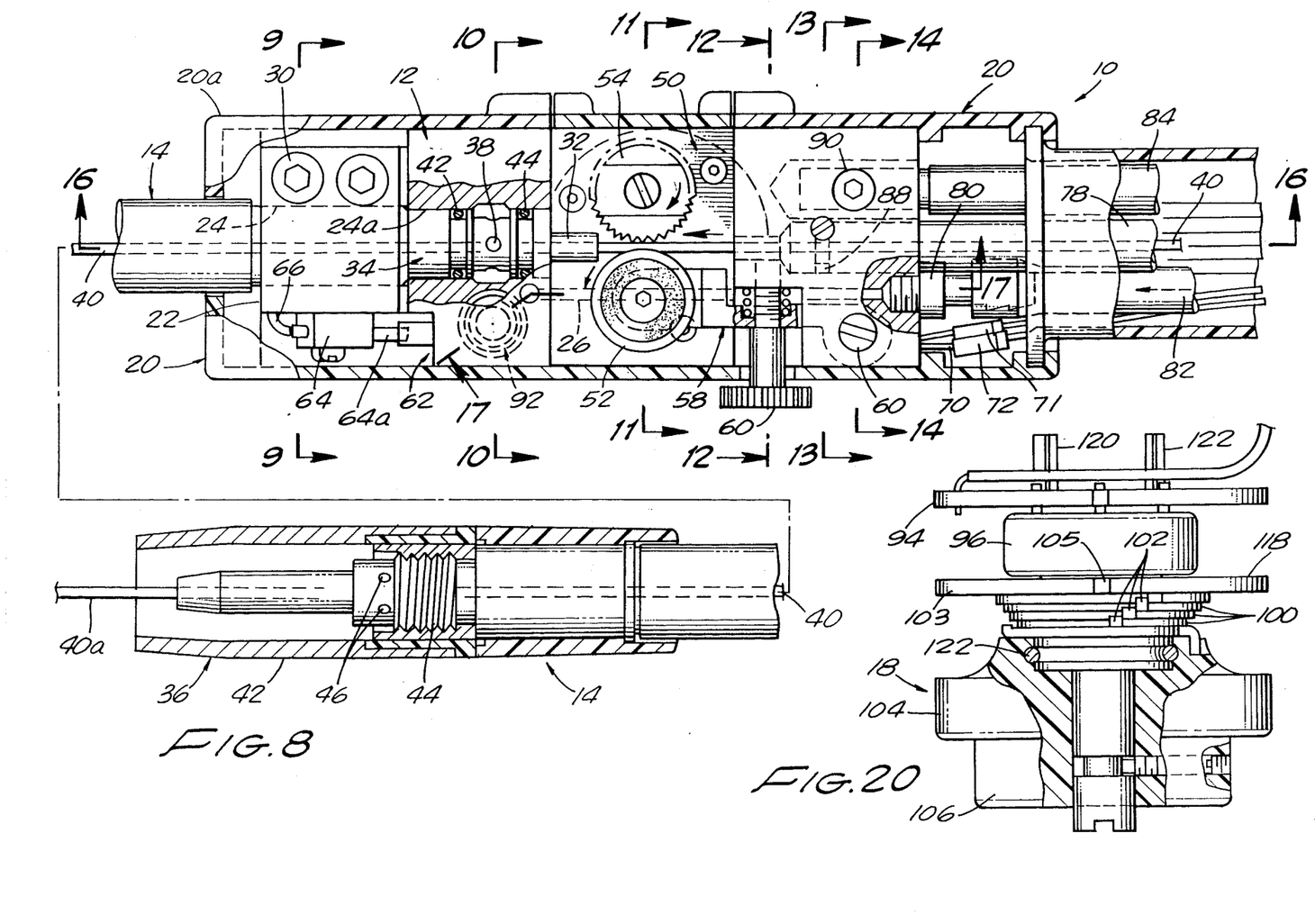
FIG. 8 is a sectional view taken along line 8—8 of FIG. 6.
FIG. 20 is an enlarged side elevational view of the speed control mechanism for the welding gun of this invention.
Figure 9:
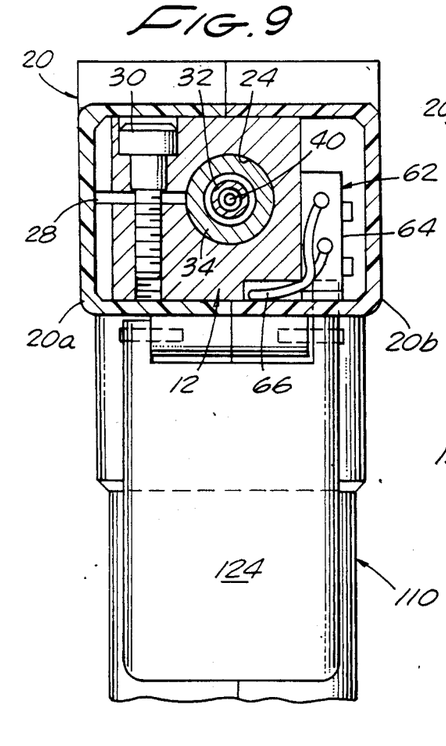
FIG. 9 is a cross-sectional view taken along line 9—9 of FIG. 8.
Figures 14, 19:
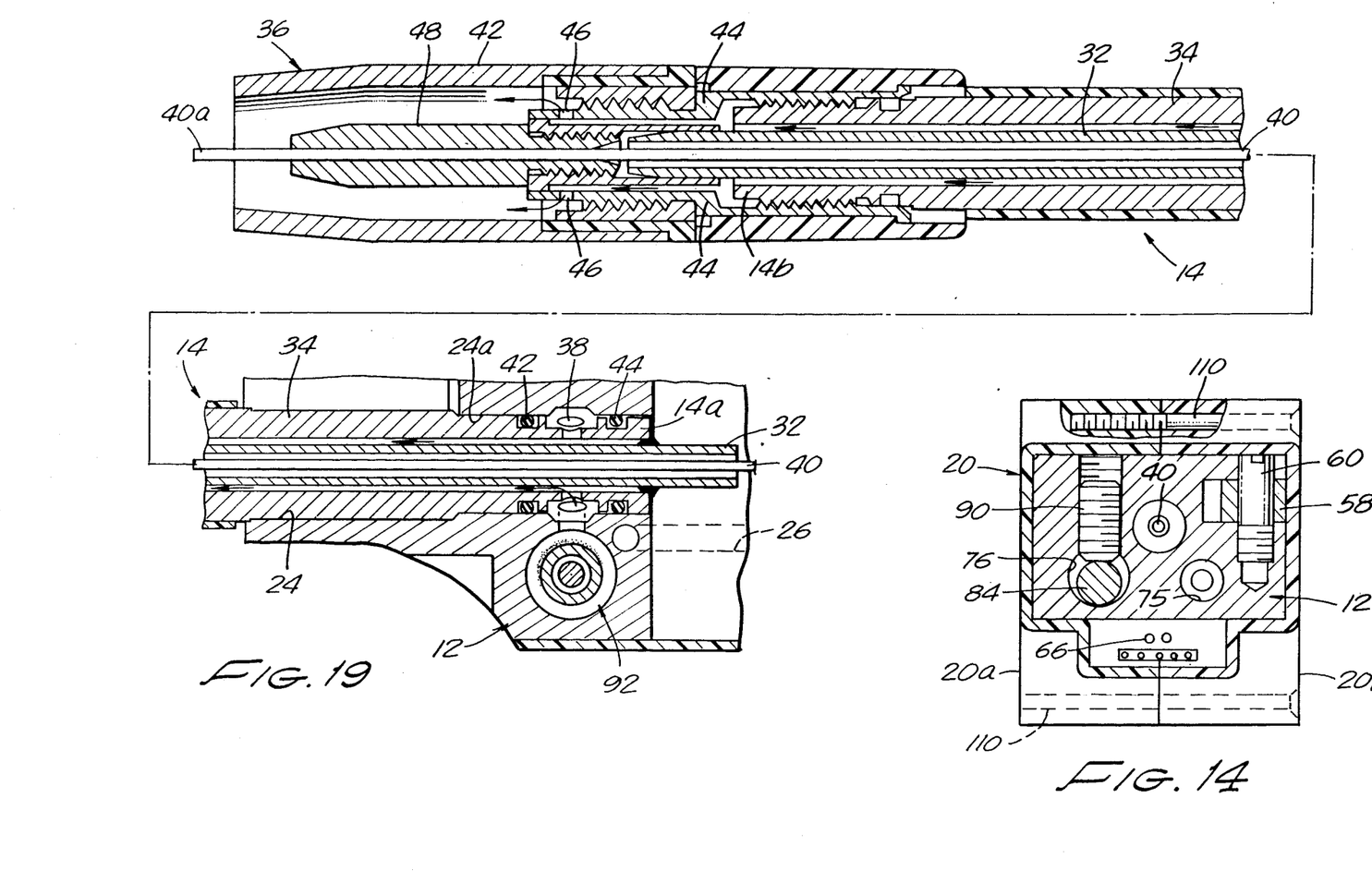
FIG. 14 is a cross-sectional view taken along line 14—14 of FIG. 8.
FIG. 19 is a cross-sectional view of the barrel of the welding gun of this invention.

As shown in FIG. 19, the barrel 14 has two coaxial tubes 32 and 34 extending through it from its rear end 14a. its forward end to which is removably attached a contact tip 36. The rear end is inserted into the opening 24 in the block. In general, the barrel 14 is of conventional design and includes passageway orifices 38 that allow gas flowing out the passageway 26 in the block 12 to flow into the space between the outer tube 34 and inner tube 32 and then out the orifice near the tip 40a of the wire 40 as the wire is feed to the work piece being welded. The gas serves to shield the tip 40a of the wire 40. As best shown in FIGS. 8 and 19, a pair of O-rings 42 and 44 are seated in grooves in the rear end 14a of the barrel 14 and fit snug against the inside wall 24a of the opening 24a in the block 12. When the screw 30 is tightened to decrease the width of the slit 28, the wall 24a of the opening 24a is drawn inwardly to hold the barrel 12 snug in position. By unscrewing the screw 30, the slit 28 is opened up, releasing the pressure being applied to allow the barrel 14 to be manually removed from the block 12.

The contact tip 36 is screwed onto the tube 34 and includes a cover section 42 that is screwed onto an adapter 44 having posts 46 that allows shielding gas to cover the wire tip 40a. The wire 40 is fed through a removable end piece 48, with a space between this piece and the adapter being in connection with the space between the tubes 32 and 34. Thus, gas flows through the passageway 26, between the tubes, between the space between the adapter and end piece out the port.

At the central portion of the block 12 is a cut away section 50 to provide a recess in which is seated an idle roller 52 and a drive roller 54 for the welding wire. The motor 16 is attached to the block 12 immediately beneath the recess and the drive roller 54 is attached to the drive shaft 56 of the motor. The idle roller 52 is mounted on a hinge like member 58 that pivots about pin 60 permitting it to be moved towards or away from the drive roller 54. A spring biased adjusting screw 60 control the pressure applied to the wire 4 as it passes between the mix of idler and drive rollers.

Figure 10:
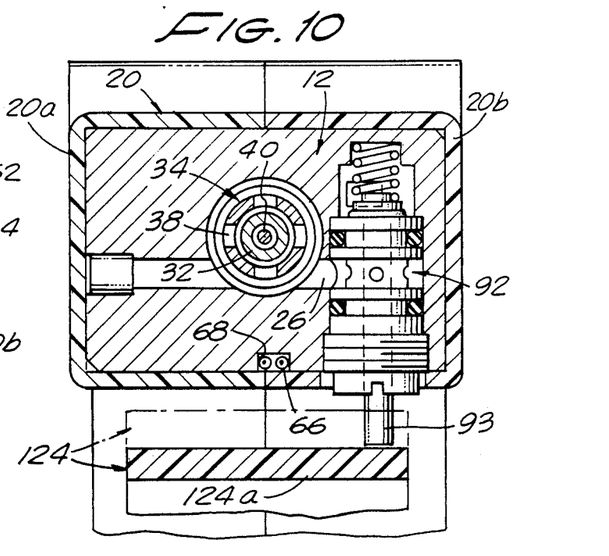
FIG. 10 is a cross-sectional view taken along line 10—10 of FIG. 8.
Figure 11:
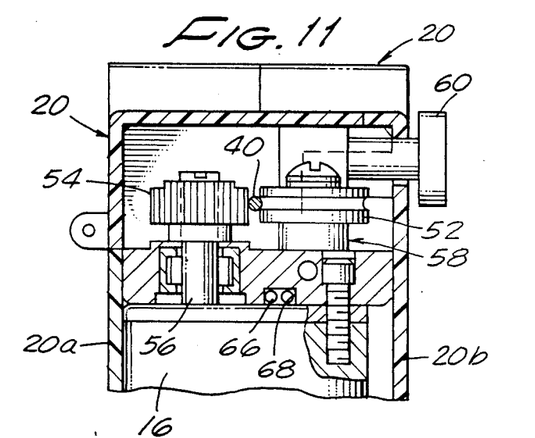
FIG. 11 is a cross-sectional view taken along line 11—11 of FIG. 8.
Figure 12:
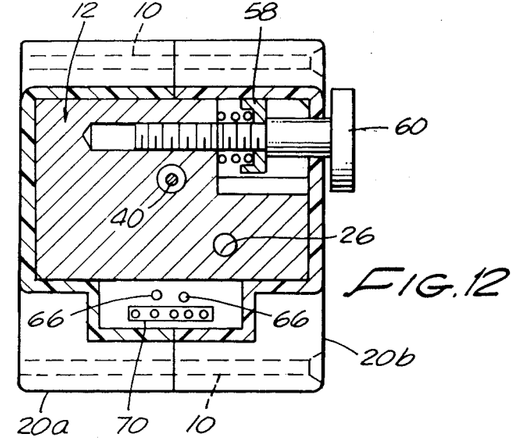
FIG. 12 is a cross-sectional view taken along line 12—12 of FIG. 8.
Figure 13:
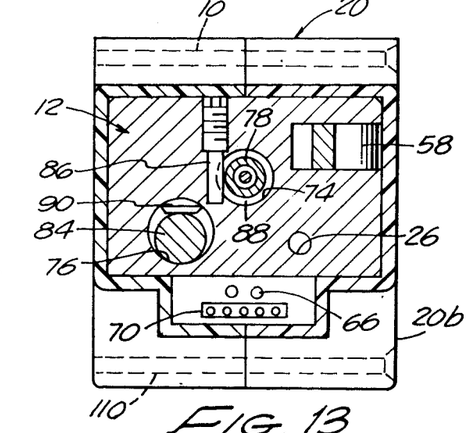
FIG. 13 is a cross-sectional view taken along line 13—13 of FIG. 8.

There is another cut away section 62 (FIG. 4) at the forward end of the block 12 in the sidewall of the block which provides a space for removably mounting a micro switch 64. This switch 64 includes a contact arm 64a which, when actuated, closes the switch to allow electrical energy to drive the motor 16. A cable 66 for the switch 64 is fed off to the side and underneath in a groove 68 (FIG. 10) the block and it is terminates in quick disconnect connector 71. A cable 70 from the motor 16 is connected to the speed control mechanism 18 and it has a quick disconnect connector 72 for easy connecting or disconnecting to the control wires signaling the wire feeder (not shown). Both of these cables 66 and 72 are aligned to form an overall flat cable structure which extends outwardly from the rear of the gun 10.

Figure 15:
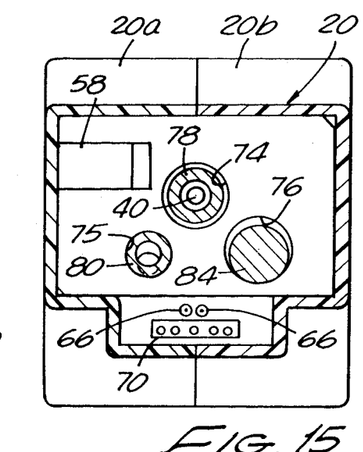
FIG. 15 is a cross-sectional view taken along line 15—15 of FIG. 16.
Figure 16:
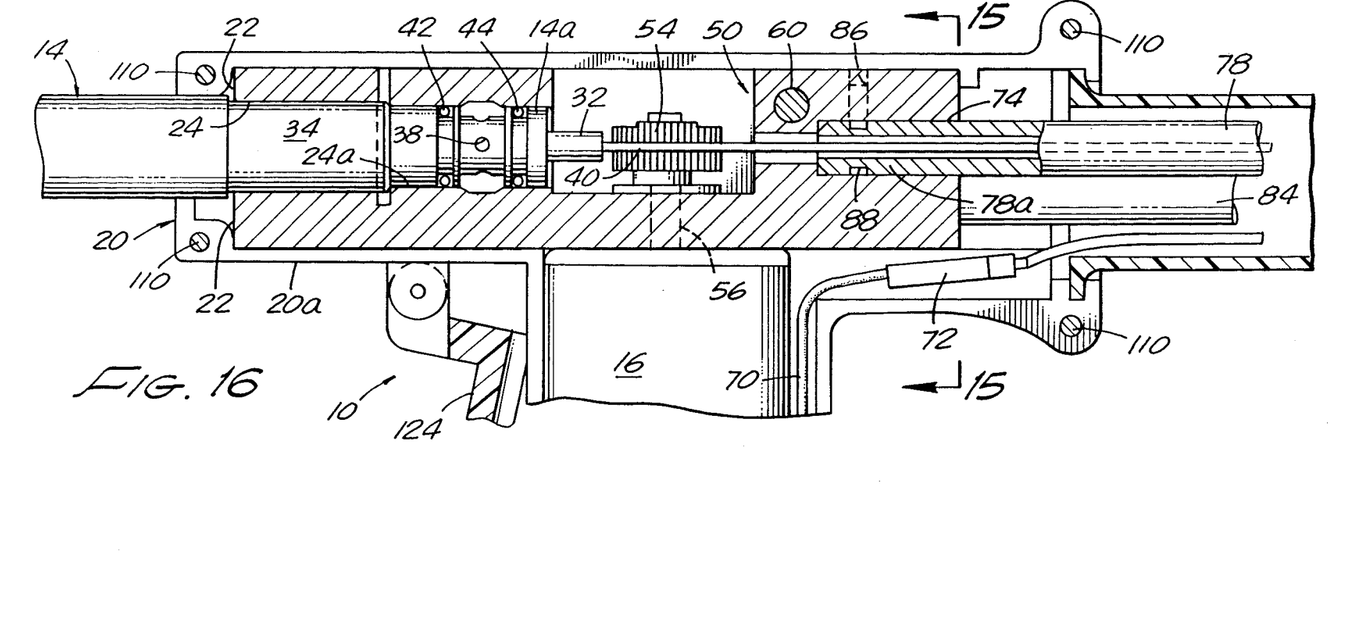
FIG. 16 is a cross-sectional view taken along line 13—16 of FIG. 8.

As shown in FIG. 15, the rear of the mounting block 12 has three bores 74, 75, 76 in it which serve as the sites for connecting, respectively, the welding wire conduit 78 through which the welding wire 40 is fed, the gas connector 80 (FIGS. 4 and 6) for the gas hose 82, and the electric power cable 85. The welding wire conduit 78 has a set screw 78 extending downwardly into a groove 88 in the end 78a of welding conduit 78. This allows the set screw to travel along the groove 88 as the welding conduit 78 is rotated as the gun 10 is being manipulated. The power cable 84 is simply electrically connected by means of the screw 90 so that there is intimate contact between the power cable and the block 12. Current then flows from the cable along the block through the inner tube 32 to the adapter 44 and end piece 48 that receives the welding wire 40. An arc forms between the tip 40a of the wire and the work piece. Thus, the current flows to the welding wire as it exits the barrel. The gas connector 80 simply includes a prong element 80a which fits into the end of the gas hose 82 and a threaded element 80b (FIG. 17) which is screwed into the opening in the block 12. The shielding gas flows through a hollow passageway connector 80 into the gas passageway 26 past open valve 92 into the space between the inner and outer tubes 32 and 34 in the barrel 14 to the tip of the barrel where it shields the tip 40a of the welding wire 40 as it approaches with the work piece.

As best shown in FIGS. 4, 6, 7 and 20, the speed mechanism 18 control for the motor 16 includes a PC board 94 to which are attached to the cable 70, a conventional rotary potentiometer 96, a series of rotatable disks 100 which are stacked one upon each other and have slightly reduced diameters with tabs 102 securely mounted to the circumference of each of these disks, a stop 103 having a stop element 105, and a control knob 104 including a raised element 106 which the welder may grasp and turn.

Figures 6, 7:
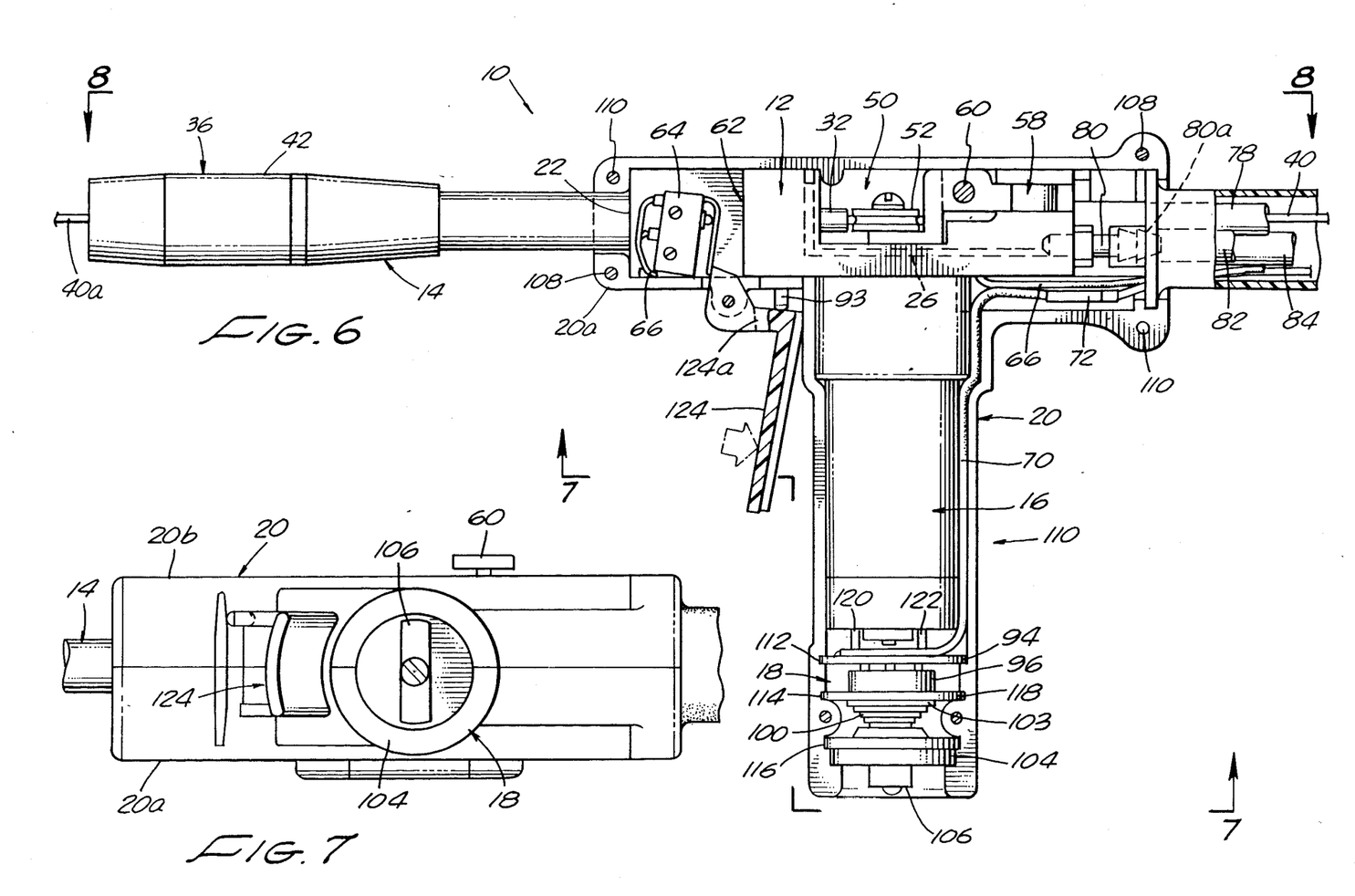
FIG. 6 is a side elevational view with one section of the casing removed.
FIG. 7 is a sectional view taken along line 7—7 of FIG. 6.

As illustrated in FIGS. 1–4, The casing 20 is generally of a T-shaped configuration, molded of a suitable plastic material which serves as an electrical insulation. This casing 20 is divided into two sections 20a and 20b which are essentially mirror images of one another and include a series of mounting sites 108 along their edges which allows the casing to be screwed together by screws 110 that are received in the mounting sites 108. As shown in FIG. 6, with sections 20b removed, the casing 20 fits snugly around the mounting block 12, motor 16 and speed control mechanism 18, with suitable space being provided in the handle casing for the speed control mechanism and to allow the cables 70 to be placed between the motor and casing wall as shown.

In accordance with an important feature of this invention, the speed control mechanism 18 is conveniently located at the end of the handle 110 which is formed by casing 20 surrounding the motor and speed control mechanism 18. This casing 20 has an opening at the end of the handle to allow access to the raised element 106 which is exposed so the welder may rotate the control knob 104 either clockwise or counterclockwise. The casing 20 is molded so that there are three ledges 112, 114, and 116 (FIG. 6) that provide a place for the knob 104, a lip 118 of the potentiometer 96, and the PC board 94 to be held securely when the two sections 20a and 20b of the casing 20 are joined together.

The motor 16 has two connecting pins (not shown) which are received in sockets 120 and 122 (FIGS. 4 and 20) in the PC board 94, with one wire respectively, for each of these sockets extending from the PC board along the inside of the casing 20 in the cable 70. Three wires are connected terminals of the components comprising the three and three-quarter potentiometer 96, such as one made by Centralab, Inc. One of these terminals is connected to reference or ground, the other terminal is connected to the voltage source, or power for the motor 16, for example, 10 volts, with a resistor (not shown) connected between these two terminals. A wiper (not shown) which moves along the resistor and it has a third terminal which is included the cable 70. When the stacked disks 100 are rotated are rotated completely in one direction, counter-clockwise for example, the wiper has been moved all the way to the ground terminal. When the disks 100 are rotated in the clockwise direction through their full range of 1000 degrees of turn, the wiper has been moved to the other, or 10 volt terminal. Each of the disks 100 are mounted on a shaft (not shown) to enable them to rotate with the tab 102 of one adjacent disk engaging the tab of the other disk as the adjacent disk completes a 360 degree turn. The stop 105 on the stop plate 103 limits the rotation of the disks 100 to about 1000 degrees.

Figure 1:
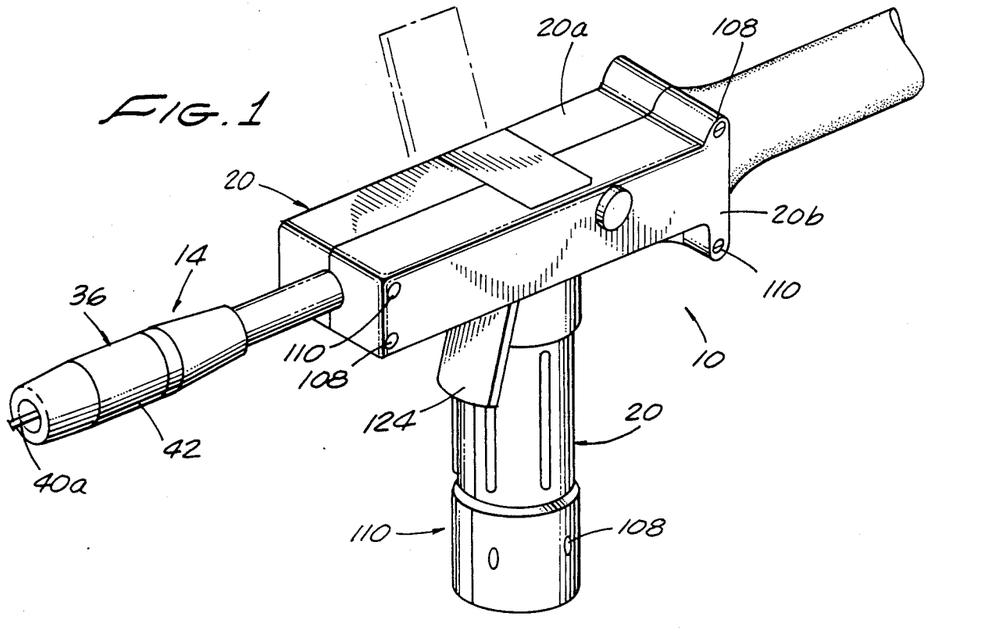
FIG. 1 is a perspective view of the welding gun of this invention.
Figure 2:
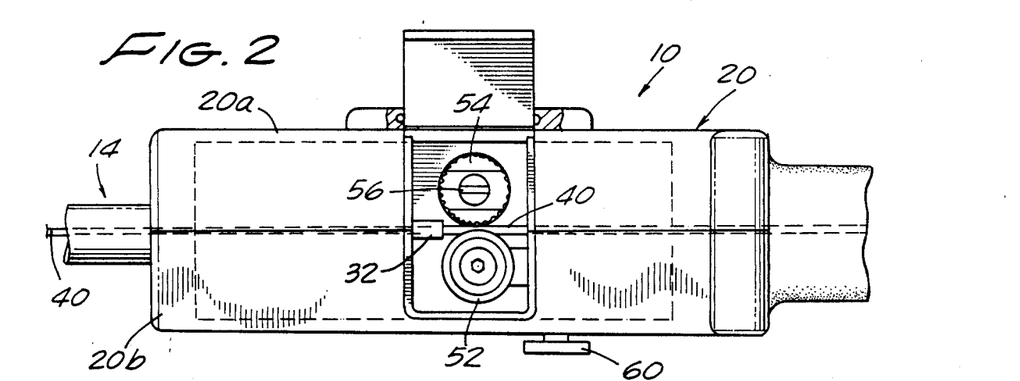
FIG. 2 is a plan view of the gun shown in FIG. 1 with a cover open showing the welding wire feed rollers.
Figure 3:
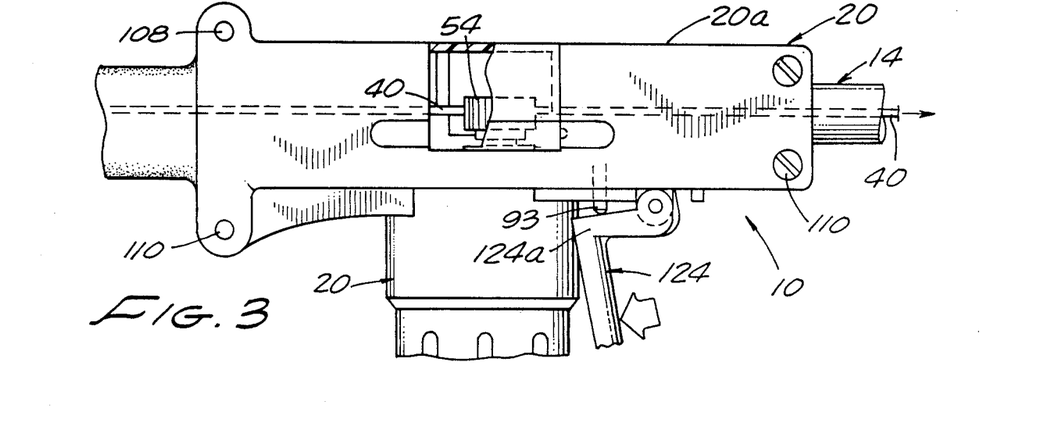
FIG. 3 is a side elevational view of the gun shown in FIG. 1 with section broken away.
Figures 4, 5:
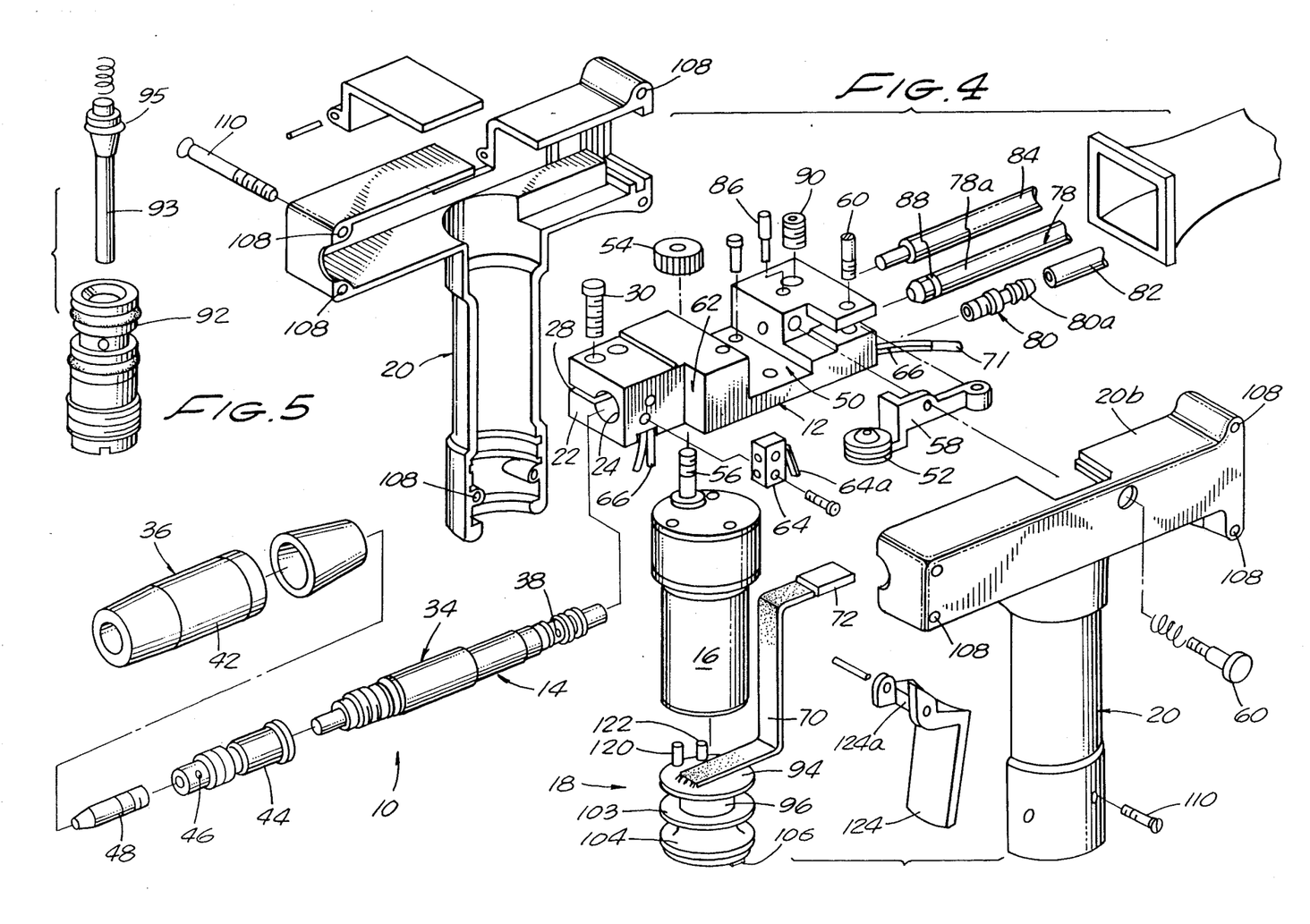
FIG. 4 is an exploded perspective view of the gun of this invention.
FIG. 5 is an exploded perspective view of the gas valve.

The control knob 104 is secured at its face to the exterior disk and rotates this disk as it revolves. There is a O-ring 122 that provides resistance to the turning of the knob 104 to enable the welder to better feel the knob actually turning and the disks 100 engage as their respective tabs 102 abut one another. For example, when the lowest disk (as shown in FIG. 2) is rotated through 360 degrees, the tab 102 on this disk engages the tab on the disk immediately above so that now both disks will rotate through 360 degrees as the control knob is continued to be turned until the tab on the topmost disk engages the stop element 105 When the wiper has been moved through its full 1000 degrees of turn, the tab 106 engages the stop 105. Reversing the direction of rotation of the speed control knob 104 will simply reverse the turning so that topmost disk will first move through 360 degrees of turn, then the next disk and so on.

The speed control mechanism 18 is designed so that (a) the welder can thus feel or experience a tactile response through his work glove as he adjusts the wire speed by turning the control knob 104, and (b) to provide a broad turning range, for example, in excess of about 1000 degrees of rotation over a wide wire speed range, for example, 0 to 1000 inches per minute. Typically, one degree of rotation corresponds to one inch per minute of wire speed.

The trigger 124 is mounted near the micro switch 64 and valve 92, The valve 92 is conventional and includes an actuator 93 that, when depressed moves the valve head 95 off its seat to open the passageway 26. The trigger 124 has an element 124a (FIG. 6) which when the trigger is pulled first engages the valve actuator to depress this actuator inwardly to lift the head 95 off its head 93 allowing gas to flow to the tip of the barrel 14 and then next engages the micro switch contact 64a to turn on the motor 16. When the trigger 124 is released, the micro switch contact 64a is first disengaged and then the valve actuator 93 is released to close the passageway 26 and prevent gas flowing through to the tip of the barrel.

SUMMARY

As pointed out above, one of the principal features of the welding gun 10 on this invention is its compactness, due primarily to the small size of the mounting block 12 and the ability to mount on or include within this block the passageway 26, drive and idle rollers 52 and 54 for the welding wire 40, micro switch 64 for controlling the operation of the motor 16, and barrel 14. The barrel 14, motor 16, micro switch 64, and drive and idle rollers 52 and 54 are detachably mounted to the block 12 so that they can be easily removed and tested during trouble shooting.

The block 12 is electrically isolated by the casing 20 which is split into two essentially identical halves which fits snugly about the mounting block 12 and motor 16, including the speed control mechanism 18 for the motor. Again, a repairman can easily disassemble the casing 20 to provide access to the internal components of the gun 10 which can then be tested and replaced if necessary. The power cable 84, gas hose 82, and welding wire conduit 78 are all easily connected and disconnected to the rear of the mounting block, and the wire cables 66 and 70 from the switch 64 and motor 16 fit snug within the casing when assembled, terminating cable connectors 71 and 72 so that the control wires can be easily attached and detached from the gun. The barrel 14, including its removable tip 36, may also be removed when desired.

To use the gun, the welder simply grasps the handle 110 in a conventional manner, with the index finger being used to depress the trigger 124 when desired. With the gas hose 82, wire welding conduit 78, power cable 84 and control cables 66 and 70 connected to the rear of the gun, the welder is in a position to use the gun in spaces which are difficult to access with large guns. When the welder depresses the trigger 124, the trigger element 124a first depresses the valve actuator 93 to open the passageway 26 and allow gas to flow through the passageway, past the valve 92 into the space between the inner and outer tubes 32 and 34 of the barrel 14 out the tip 36 covering the tip 40a of the wire 40. Next, the trigger element 124a engages the contact 64a of the switch 64 to close the switch and provide power to the motor 16 causing the drive roller 54 to turn to feed the welding wire 40 along the conduit 78 out the tip 36. If the welder desires to change the wire feed, he simply grasps the control knob 14 by the raised element 106 to rotate the control element either clockwise to increase the speed or counter-clockwise to decrease the speed. Because of the O-ring 122 and the disks 100 with their associated tabs 102, the welder can feel the knob turning through the glove protecting his hand. This provides him with a sense of the position of the control knob so that he is able to correlate it with the desired wire speed.

SCOPE OF THE INVENTION

The above description presents the best mode contemplated of carrying out the present invention. This invention, however, is susceptible to modification and alternate constructions with the embodiment shown in the drawing and described above. Consequently, it is not the intention to limit the invention to the particular embodiment disclosed. On the contrary, the intention is to cover all modifications and alternate constructions coming within the spirit and scope of the invention as generally expressed by the following claims.

I claim:

1. A welding gun including,
   an elongated mounting block made of an electrically conductive material and having a rear face, a central section, a front face, and a passageway extending through the block from the rear face to the front face,
   drive means mounted in the central section for feeding welding wire entering the gun at the rear face, passing through the block and exit the block through the front face,
   barrel means having a tip and opposed rear end which is removably attached to the front face by the rear end, said welding wire being fed by the drive means through the barrel to exit at said tip,
   valve means mounted within the block in communication with the passageway for controlling the flow of gas through the passageway, said valve means including a valve actuator which opens the valve to allow gas to flow through the passageway and out said tip,
   motor means removably mounted to the block near the central section and connected to drive means to provide the means for turning the drive means, said motor means being generally elongated to provide a handle for the gun, and including
   a variable speed control mechanism so that the wire may be moved through the gun at different speed rates, said control mechanism including,
   variable speed control means for the motor means which is mounted at the free end of the motor opposite the end of the motor mounted to the block,
   said speed variable control means including a potentiometer having slider means which moves through at least a 1000 degrees of rotation, and degree of control with minimum sensitivity in the control adjustment,
   switch means mounted to the block which controls the operation of the motor means, said switch means being near the valve actuator,
   a removable insulating casing member which encloses the block and motor, and
   trigger means adjacent the motor including a trigger element which when the trigger is depressed first engages the valve actuator to open said valve and next engages the switch means to turn on the motor means.

2. The welding gun of claim 1 wherein the central section comprises a cut away that forms a recess in which the drive means are mounted.

3. A welding gun including,
   an elongated mounting block made of metal and having a rear face, central cut away section, a front face, and a passageway extending through the block from the rear face to the front face,
   said block having a long dimension which does not exceed five inches, a width dimension which does not exceed one and three-quarter inch, and a height dimension which does no exceed 1.5 inch,
   drive means mounted in the cut away section for feeding welding wire entering the gun at the rear face through the block to the front face, said drive means including a drive roller mounted on a drive shaft which extends through the block,
   barrel means having a tip and an opposed rear end by which said barrel is removably attached to the front face, said welding wire passing through the barrel to exit said tip,
   said barrel including a pair of concentric conduits with the wire passing through the inner conduit and the space between the inner and outer conduits providing a gas passageway which is in communication with the passageway in the block,
   valve means mounted within the block and in communication with the passageway therein for controlling the flow of gas through the passageway, said valve means including a valve actuator which when actuated opens the valve means to allow gas to flow through the passageway into the space between the inner and outer conduits in the barrel,
   motor means removably mounted to the block, said motor means being coupled to the drive shaft and being generally elongated to provide a handle for the gun,
   switch means removably mounted to the block which controls the operation of the motor means, said switch means and valve means being near each other,
   a speed control mechanism removably mounted to the handle for controlling the motor speed, said speed control mechanism including a rotatable member, and a tactile response element which desensitizes the speed control and enables the welder to correctly position the speed control even when his hand is covered by a glove,
   a removable insulating casing which encloses the block, motor, and speed control element with the control knob being positioned near the end of the motor so that the control knob is exposed and positioned at the end of the handle formed by the casing enclosing the motor and speed control, and
   removable trigger means adjacent the motor, and including a trigger element which when depressed first engages the valve actuator and next engages the switch for operating the motor.

* * * * *